United States Patent [19]

Waugh et al.

[11] Patent Number: 4,643,790
[45] Date of Patent: * Feb. 17, 1987

[54] PLASTIC-CAPPED ADHESIVE ARTICLE AND METHOD FOR MAKING SAME

[75] Inventors: Robert E. Waugh, Sun City Center, Fla.; Urban R. Nannig, North Kingstown, R.I.; Clyde R. Rockwood, Columbus, Ohio

[73] Assignee: The D. L. Auld Company, Columbus, Ohio

[*] Notice: The portion of the term of this patent subsequent to Sep. 16, 2003 has been disclaimed.

[21] Appl. No.: 820,646

[22] Filed: Jan. 21, 1986

Related U.S. Application Data

[63] Continuation-in-part of Ser. No. 744,014, Jun. 12, 1985, Pat. No. 4,612,075.

[51] Int. Cl.$^4$ .............................................. B60R 13/04
[52] U.S. Cl. ................................... 156/242; 156/247; 156/249; 264/131; 264/132
[58] Field of Search ................... 156/242, 247, 249; 264/130, 131, 132

[56] References Cited

U.S. PATENT DOCUMENTS

| | | | |
|---|---|---|---|
| 1,693,561 | 11/1928 | Klein | 427/282 |
| 2,021,961 | 11/1935 | MacFarlane | 264/130 |
| 2,354,857 | 8/1944 | Gits et al. | 428/187 X |
| 2,376,305 | 5/1945 | Bauer | 428/187 X |
| 3,235,396 | 2/1966 | Haberlin | 428/40 |
| 3,843,475 | 10/1974 | Kent | 428/31 X |
| 3,914,482 | 10/1975 | Sawa et al. | 428/31 |
| 3,964,906 | 6/1976 | Kenney | 427/54 X |
| 3,974,311 | 8/1976 | Cherrin | 428/43 |
| 4,010,297 | 3/1977 | Wenrick | 428/31 |
| 4,100,010 | 7/1978 | Waugh | 428/64 X |
| 4,135,033 | 1/1979 | Lawton | 428/442 X |
| 4,210,693 | 7/1980 | Regan et al. | 428/162 X |
| 4,220,681 | 9/1980 | Narita | 428/31 |
| 4,259,388 | 3/1981 | Reed | 428/28 X |
| 4,296,155 | 10/1981 | Madonia | 428/31 |
| 4,331,704 | 5/1982 | Watson, Jr. et al. | 427/54.1 |
| 4,332,074 | 6/1982 | Auld et al. | 264/1.9 X |
| 4,351,686 | 9/1982 | Clark | 428/448 X |
| 4,356,617 | 11/1982 | Coscia | 264/132 X |
| 4,409,264 | 10/1983 | Gilleo et al. | 428/156 X |
| 4,446,179 | 5/1984 | Waugh | 428/31 |
| 4,460,429 | 7/1984 | Goscia et al. | 156/219 X |
| 4,481,160 | 11/1984 | Bree | 428/13 X |
| 4,521,479 | 6/1985 | Maglio et al. | 428/507 |
| 4,566,929 | 1/1986 | Waugh | 156/242 |
| 4,605,575 | 8/1986 | Auld et al. | 428/542.2 X |

FOREIGN PATENT DOCUMENTS

| | | |
|---|---|---|
| 58-93984 | 6/1983 | Japan . |
| 58-136078 | 10/1983 | Japan . |
| 58-192679 | 12/1983 | Japan . |

*Primary Examiner*—Henry F. Epstein
*Attorney, Agent, or Firm*—Killworth, Gottman, Hagan & Schaeff

[57] ABSTRACT

A plastic-capped adhesive article and method of manufacture are provided. The article includes a plastic cap which is applied as a liquid directly to the upper surface of a layer of pressure sensitive adhesive and then cured. Optionally, the upper surface of the adhesive may be treated to render it substantially tack free and suitable for printing thereon prior to the application of the plastic cap.

11 Claims, 2 Drawing Figures

U.S. Patent  Feb. 17, 1987  4,643,790
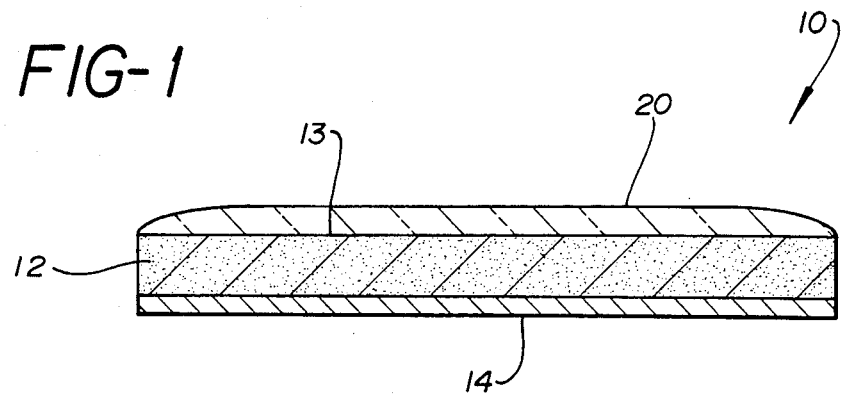
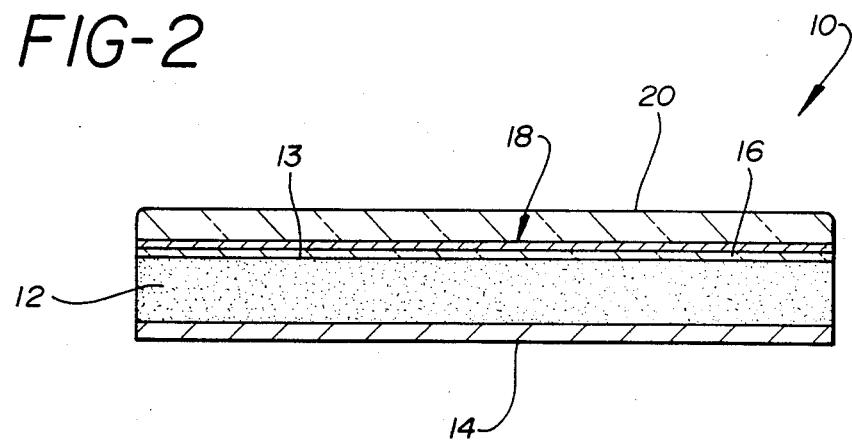

PLASTIC-CAPPED ADHESIVE ARTICLE AND METHOD FOR MAKING SAME

CROSS REFERENCE TO RELATED APPLICATIONS

This application is a continuation-in-part of U.S. application Ser. No. 744,014 filed June 12, 1985 now U.S. Pat. No. 4,612,075.

BACKGROUND OF THE INVENTION

The invention relates to a plastic-capped adhesive article of the type designed to be attached to a substrate for protection and/or decoration and method for making the same.

Trim strips and other plastic-capped articles of various configurations have been used in industry to decorate and protect the surfaces of various articles including automobile body side surfaces, bumpers, tailgates, and the like. In recent years, emphasis has been placed on replacing chromed metallic trim strips with plastic trim strips which do not corrode and which can be attached to an automobile body adhesively without fasteners. Examples of plastic trim or molding strips include Waugh, U.S. Pat. No. 4,446,179, Madonia, U.S. Pat. No. 4,206,155, Narita, U.S. Pat. No. 4,220,681, Wenrick, U.S. Pat. No. 4,010,297, Sawa et al, U.S. Pat. No. 3,914,482, and Kent, U.S. Pat. No. 3,843,425.

Many of these trim strips are formed on plastic resin substrates onto which another layer or layers of decorative metal or plastic are placed. For example, Waugh, U.S. Pat. No. 4,446,179, discloses a trim strip having an adhesively-backed foil substrate of metal or plastic over which is cast a curable liquid plastic resin. The resin forms a lens cap over the substrate, giving a lens effect to the decorative indicia printed on the foil.

However, the need for such foil substrates adds to the costs of manufacture of such trim strips. Additionally, the thickness of the substrate may limit the overall flexibility of the article and make it more difficult to adhere permanently to contoured surfaces. Accordingly, there is a need in the art for a plastic-capped adhesive article and method of manufacture which is both inexpensive to make and has the requisite flexibility to mold and adhere to contoured surfaces.

SUMMARY OF THE INVENTION

The present invention provides a process for making a plastic-capped article in which decorative indicia and the like may optionally be printed directly onto the upper surface of an adhesive layer. The present invention eliminates the need for an intermediate metal, paper, or plastic substrate and produces a finished flexible article which is ready to be adhered to any intended surface such as the side of an automobile body. Likewise, it can be used as an insert for premolded trim, bumpers, or bumper guards, or can be used to decorate other articles having contoured surfaces.

According to one aspect of the present invention, a plastic-capped adhesive article is made by providing a layer of pressure sensitive adhesive on a support surface. A measured amount of a curable plastic resin is then applied onto a first (upper) surface of the layer of pressure sensitive adhesive. The resin is then cured and hardened to provide an assembly of a plastic cap over the adhesive layer. After formation of the plastic cap, individual articles may be die cut, stamped out, or otherwise separated from the assembly.

In a preferred method of forming the plastic-capped article, the layer of pressure sensitive adhesive is supported on a sheet or web of release liner which has been coated so that it may be readily peeled away from the adhesive article prior to use. The adhesive may be applied to the release liner in a conventional manner such as by spraying or roll coating. The adhesive may be clear, or is preferably colored.

The plastic cap which is formed may be in the form of a lens or positive meniscus which forms as the liquid resin is cast onto the adhesive layer. Alternatively, a relatively flat cap may be applied by flow coating, spraying, or extruding a liquid resin onto the first (upper) surface of the adhesive. These latter alternative procedures are preferred where a relatively large support sheet or web is used, and a plurality of articles may be then separated after the resin has cured.

Optionally, the first surface of the pressure sensitive adhesive may be rendered substantially tack free and suitable for the printing of indicia directly thereon prior to the application of the plastic cap. This procedure may be performed for all or only certain portions of the first surface of the adhesive, as desired. This may be accomplished by, for example, coating or spraying the first surface of the adhesive with a hardenable or curable liquid, by coating with a particulate material, by coating with a hot stamp foil, or by spray metallizing the surface. These detackifying procedures may leave either a clear or colored, transparent surface or may be opaque. In this manner, the color of the finished article may be determined by the color of the pressure sensitive adhesive, the color of the detackified surface, or a combination of the two.

The thus treated first (upper) surface of the adhesive may then optionally be printed or otherwise decorated by silk-screening or other conventional printing techniques. After the plastic-capped articles have been formed, and the plastic cap cured, individual articles may then readily be separated from the assembly by die cutting, stamping, or other conventional separation techniques. They may be supported on the release liner until they are ready to be applied to an intended surface.

The present invention thus provides plastic-capped adhesive articles without the need for an intermediate metal, paper, or plastic substrate as required by the prior art. The plastic-capped articles produced by the process of the present invention provide increased flexibility and relative ease of manufacture.

Accordingly, it is an object of the present invention to provide a process for making a substrateless plastic-capped adhesive article and the article produced thereby. This, and other objects and advantages of the invention, will become apparent from the following detailed description, the accompanying drawings, and the appended claims.

BRIEF DESCRIPTION OF THE DRAWINGS

FIG. 1 is a cross-sectional side view of a plastic-capped adhesive article produced by the process of the present invention; and FIG. 2 is a cross-sectional side view of a plastic-capped adhesive article having a detackified adhesive surface which has been decorated, produced by another embodiment of the process of the present invention.

DETAILED DESCRIPTION OF THE PREFERRED EMBODIMENTS

FIGS. 1 and 2 illustrate, in cross-section, plastic-capped adhesive articles produced by alternative embodiments of the present invention. Article 10 has a layer of pressure sensitive adhesive 12 having a first upper surface 13 and a second lower surface. Pressure sensitive adhesive 12 can be any of a number of commercially available adhesives such as, for example, an acrylic pressure sensitive adhesive. The lower surface of adhesive 12 is adhered to a release liner 14 or other releasable support surface. Liner 14 is preferably coated with a release material such as as silicone-based polymer which permits ready removal of article 10 when it is desired to adhere article 10 to an intended substrate. Of course, other known release agents may also be utilized on liner 14.

Adhesive 12 may be applied to liner 14 by any suitable means such as by spraying or roll or dip coating. Preferably, adhesive layer 12 is applied in a thickness of from between about 0.002 to 0.010 inches.

The adhesive 12 may then optionally be treated to render the upper surface 13 of the adhesive substantially tack free and suitable for printing indicia 18 directly thereon. The lower surface of adhesive 12 remains tacky so that the finished article may be adhered to an intended surface. The treatment of upper surface 13 of adhesive 12 to render it substantially tack free and suitable for printing directly thereon may be accomplished by a number of different procedures such as coating, spraying, or extruding with a hardenable or curable liquid material such as a lacquer or transparent synthetic polymer resin, coating or dusting with a particulate material, hot stamping with a metal foil, spray metallizing, applying a cross-linking agent to the surface of the adhesive, or applying heat or light energy (e.g., ultraviolet light) to cross-link the surface of the adhesive. All of these treating procedures produce a non-selfsupporting surface 16 which is substantially tack free and printable.

In one preferred procedure, upper surface 13 of adhesive 12 is overcoated with a thin layer of a transparent, clear or colored lacquer which forms non-tacky surface 16 and seals the upper surface of the adhesive. Alternatively, upper surface 13 may be dusted with a fine particulate material of inert particles such as mica or talc. Upper surface 13 may also have a thin curable liquid polymer resin applied thereto by coating, spraying, or extruding.

In yet another alternative procedure, a bright metallic surface may be applied to upper surface 13. This can be accomplished by applying a bright metal hot stamp foil to upper surface 13 by means of a pressure roll or the like. The foil is accompanied by a carrier film which is then stripped away leaving a bright metallic non-tacky and printable surface 16. The metallic surface may be gold, silver, or chrome colored, or other colors may be used as desired. The overall thickness of the bright metallic surface is desirably 0.001 inches or less.

Once upper surface 13 has been treated and rendered substantially tack free, any suitable indicia 18 may be printed directly thereon. These printable indicia may include letters, numbers, words, symbols, pictures, or other decoration. The printing may be accomplished by any of a number of printing techniques which are known in the art, including silk-screen printing.

Adhesive layer 12 may itself be colored by the addition of suitable pigments or dyes to the composition. If layer 12 is already colored, the need for overprinting a colored background and/or treating the upper surface 13 of adhesive 12 to render it substantially tack free may be eliminated. Likewise, if layer 12 is clear, areas of the upper surface of the adhesive may be left undecorated by indicia 18 so that when the article is applied to a substrate, the color or brightness of the substrate shows through in those areas.

After application of the layer of adhesive 12, as shown in FIG. 1, or after printing, as shown in FIG. 2, a curable liquid plastic resin is applied onto the structure. In the embodiment shown in FIG. 1, where individual articles are being formed, the liquid plastic resin is cast onto the structure and flows to the edges of the structure forming a positive-shaped meniscus. This meniscus contributes to the lens effect of plastic cap 20 which is formed when the resin is cured.

Alternatively, a relatively flat cap, such as is illustrated in FIG. 2, may be applied by flow coating, spraying, or extruding a liquid resin onto the upper surface of the structure. These latter alternative procedures are preferred where a plurality of individual articles are supported on a single larger sheet, roll, or web of release liner 14. Once plastic cap 20 has been cured, individual articles may then be die cut, stamped out, or otherwise separated from the larger sheet. In one embodiment, the individual articles may be kiss-cut (i.e., cut through to release liner 14) and left on the larger sheet or roll. In this manner, they may be shipped to ultimate users who may then readily peel the individual articles from release liner 14 for adherence to intended substrates. It will be apparent that articles of any shape or size may be formed including squares, rectangles, circles, ovals, elongated strips, and the like.

The plastic resin utilized is preferably a clear theromsetting material which is resistant to abrasion and impact. A number of plastics can be used for this purpose, but one which is particularly advantageous is an impact-resistant polyurethane. Polyurethanes useful in the practice of the present invention are two-part compositions which are the reaction product of a glycol, such as a polyether or polyester glycol, and an aliphatic diisocyanate.

The cast plastic resin is cured or otherwise hardened to form a plastic cap 20. The resin is preferably cured by heating or ultraviolet radiation. However, depending on the particular composition utilized, other methods such as radio frequency heating, hot air drying, or even the heat of an exothermic curing reaction may be utilized.

In the practice of the present invention, a unique substrateless (i.e., meaning that there is no self-supporting paper, cardboard, or plastic stock as such) article is produced which is useful as trim strips on automobile bodies, inserts for bumpers and bumper guards, or as decoration or reflectors on tailgates, walls, doors, protective headgear, and the like.

While the invention has been described in detail and by reference to specific embodiments thereof, it will be apparent that numerous modifications and variations are possible without departing from the scope of the invention, which is defined in the appended claims.

What is claimed is:

1. A method of making a plastic-capped adhesive article comprising the steps of:
   (a) providing a layer of pressure sensitive adhesive, (b) applying a curable liquid plastic resin onto a first surface of said layer of pressure sensitive adhesive, and (c) curing said resin to harden it and form a plastic-capped article.

2. The method of claim 1 including the step of treating said first surface of said pressure sensitive adhesive to render said first surface substantially tack free and suitable for the printing of indicia directly thereon.

3. The method of claim 2 including the step of decorating said treated surface by printing indicia directly thereon.

4. The method of claim 1 in which said layer of pressure sensitive adhesive is supported on a release liner.

5. The method of claim 1 in which said layer of pressure sensitive adhesive is colored.

6. The method of claim 1 in which said curable liquid plastic resin is cast onto said layer of pressure sensitive adhesive.

7. The method of claim 1 including the step of separating a plurality of individual shapes from the article of step (c) to form a plurality of individual articles.

8. The method of claim 2 in which said treating step includes applying a lacquer over said first surface of said pressure sensitive adhesive.

9. The method of claim 2 in which said treating step includes applying a particulate material on said first surface of said pressure sensitive adhesive.

10. The method of claim 9 in which said particulate material is selected from the group consisting of mica and talc.

11. The method of claim 2 in which said treating step includes applying a hot stamp metal foil over said first surface of said pressure sensitive adhesive.

* * * * *